United States Patent [19]
Yamashita

[11] Patent Number: 4,851,828
[45] Date of Patent: Jul. 25, 1989

[54] ELECTRONIC LOCKING DEVICES

[75] Inventor: Toshihiko Yamashita, Osaka, Japan

[73] Assignee: Unisafe Limited, Kowloon, Hong Kong

[21] Appl. No.: 135,765

[22] Filed: Dec. 21, 1987

[51] Int. Cl.[4] ........................ H04Q 3/00; E05B 49/00
[52] U.S. Cl. ................................ 340/825.31; 70/277; 235/382.5
[58] Field of Search ...................... 340/825.31, 825.30; 235/382.5; 364/140, 141; 70/277, 278

[56] References Cited

U.S. PATENT DOCUMENTS

| | | | |
|---|---|---|---|
| 4,079,605 | 3/1978 | Bartels | 70/277 |
| 4,213,118 | 7/1980 | Genest et al. | 235/382.5 |
| 4,232,353 | 11/1980 | Mosciatti et al. | 70/277 |
| 4,717,816 | 1/1988 | Raymond et al. | 340/825.31 |
| 4,743,898 | 5/1988 | Imedio | 340/825.31 |

FOREIGN PATENT DOCUMENTS

| | | | |
|---|---|---|---|
| 0044630 | 6/1981 | European Pat. Off. . | |
| 2561703 | 3/1984 | France . | |
| 2567947 | 7/1984 | France . | |
| WO8700233 | 1/1987 | PCT Int'l Appl. | 70/278 |
| 1456138 | 4/1974 | United Kingdom . | |
| 8002711 | 12/1980 | World Int. Prop. O. . | |

*Primary Examiner*—Gerald L. Brigance
*Attorney, Agent, or Firm*—Townsend and Townsend

[57] ABSTRACT

An electronic locking device which is particularly useful for safes in a hotel room comprises an unlocking circuit actuated when a code on a magnetic card which acts as the "key" is read by a card reader forming part of the device agrees with an unlocking code stored in the memory of the device. The unlocking code from the card is set in memory when the memory is enabled and the magnetic card is loaded into the card reader for a plurality of times within a relatively short pre-selected time interval.

4 Claims, 3 Drawing Sheets

ELECTRONIC LOCKING DEVICES

The present invention relates to electronic locking devices, and in particular, electronic locking devices to be used with magnetic cards.

BACKGROUND TO THE INVENTION

In comparison with conventional mechanical locking devices, such electronic locking devices have large merits in security and are widely used in facilities where many locking devices are required such as hotels. However, the electronic locking devices now in use in hotels and the like require issuance of a fresh magnetic card whenever a user such as a guest of a room changes, the fresh card having a code differing from those of the former users and also differing from those of other rooms. Accordingly, an expensive card issuing machine is required as well as considerable time and trouble.

Most safes installed in guest rooms of hotels and the like are provided with mechanical locking devices. Even if electronic locking devices are installed on doors of such rooms, separate keys are required for the safes. The management of such keys are troublesome and the advantages of the installation of electronic locking devices on the doors are reduced.

The present invention has been made with this in mind and it is an objective to provide an electronic locking device which requires no card issuing machine, has low installation and running costs, and is simple in operation.

BRIEF SUMMARY OF THE INVENTION

According to the present invention there is provided an electronic locking device in which an unlocking circuit is arranged to be actuated when the code of a magnetic card read by a card reader forming part of the device agrees with the unlocking code stored in the memory of the device, and in which, an unlocking code setting means is provided which stores the code of a magnetic card in the memory as an unlocking code when the memory is enabled and the magnetic card is loaded into the card reader for a plurality of times within a relatively short preselected time interval.

Such electronic locking devices are particularly suitable for use in safes to be installed in guest rooms of a hotel because the guest can use any magnetic card available to him, e.g. one of his credit or charge cards.

Magnetic cards to be used for the electronic locking device according to the present invention may be those in which identification information is written on magnetic strips according to the JIS standards, international standards, or the like, and ordinary cash cards, credit cards or the like may be used.

In the electronic locking device of the present invention, the time when the memory is enabled is to be construed as a time when the contents of the memory have been cancelled or cleared, or when the flag of the memory is not set. Such conditions may be accomplished when, for example, an employee of the hotel loads a magnetic card into the card reader, that card having a code which has been set in the electronic locking device.

In the event that the locking device has to be unlocked in an emergency, an arrangement as described in European patent application No. 87304540.5 can be adopted and reference is made to that Application for a full description. cl BRIEF DESCRIPTION OF THE DRAWINGS An example of an electronic locking device according to the invention will now be described with reference to the accompanying drawings, in which.

DESCRIPTION OF THE PREFERRED EMBODIMENT

Figure 1:
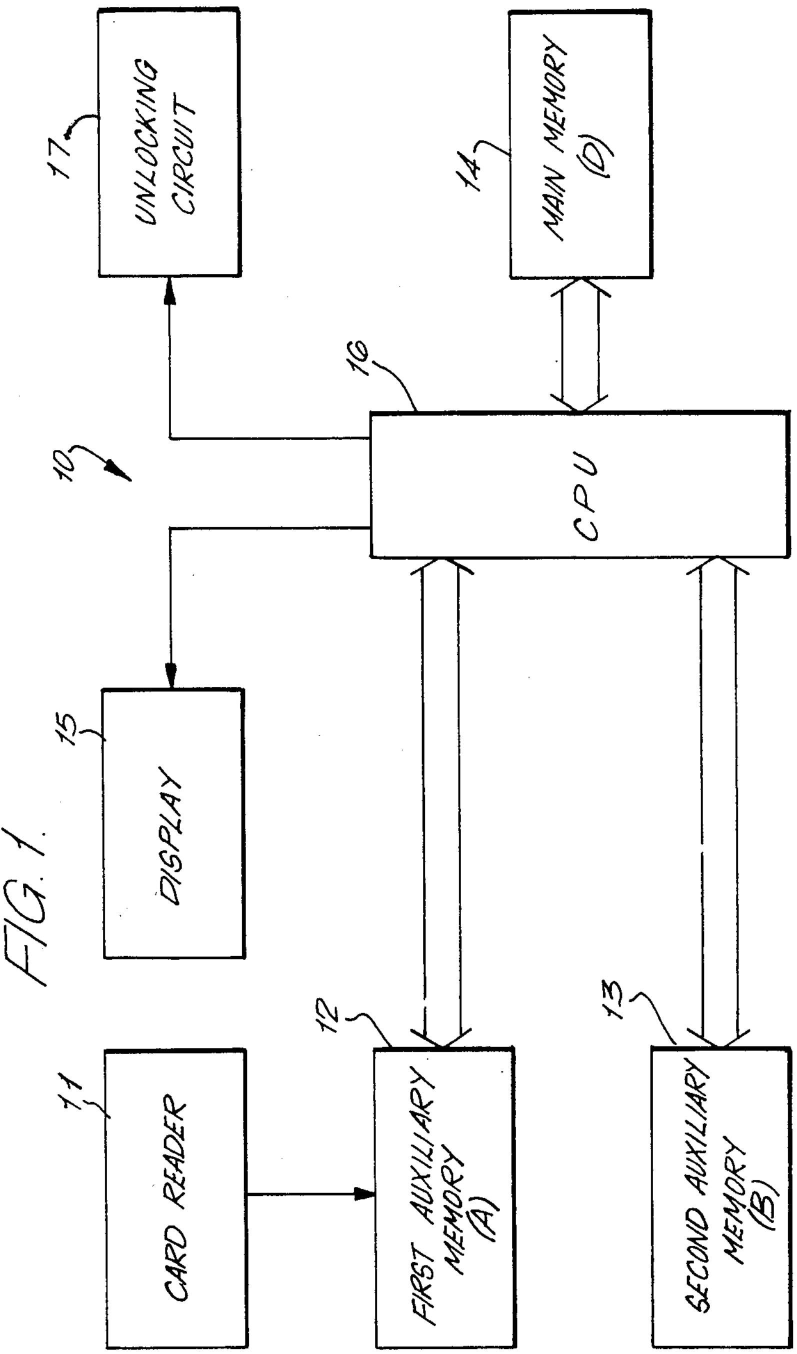
FIG. 1 is a block diagram showing the basic configuration of the electronic locking device.

The electronic locking device 10 illustrated in the drawings includes a card reader 11 for reading information encoded magnetically on magnetic cards. A first auxiliary memory 12 as provided for receiving and storing the code read by the card reader 11. A second auxiliary memory 13 and a main memory 14 for storing unlocking codes are provided. A display 15 indicates whether the contents of the first auxiliary memory 12 have been written in the main memory 14. A microprocessor (CPU) 16 controls the processing of signals according to a specified program. Finally, an unlocking circuit 17 is provided for unlocking a mechanical lock (not shown) according to a locking/unlocking command given by the CPU 16.

In the present description, the contents of the first auxiliary memory 12, the second auxiliary memory 13 and the main memory 14 will be denoted for simplicity by A, B and D, respectively.

The operation of the electronic locking device of the present invention will now be explained. The CPU 16 compares the contents of the first auxiliary memory 12 with the contents (unlocking codes) of the main memory 14 whenever a magnetic card such as a credit card is loaded into the card reader 1. It gives an unlocking command to the unlocking circuit 17 only when A is identical to D. For this purpose, a user such as a guest of the room with this electronic locking device must set the code of his or her own magnetic card, which he or she desires to use as a key card, in the main memory 4 as an unlocking code.

Now, when the main memory 14 is enabled (the step 1 of the flowchart of FIG. 2), a magnetic card is read by the card reader 11 and the information is stored in the first auxiliary memory 12 (the step 2). The CPU 16 then compares the contents A of the first auxiliary memory 2 with the contents D of the main memory 14 (the step 3).

In this case, because A is not identical to D, the CPU 16 will successively compare the contents of the first auxiliary memory 12 and the contents B of the second auxiliary memory 13 (the step 4). When A is identical to B, the CPU 6 will transfer A to the main memory 4. As the second auxiliary memory 3 keeps the contents for a short time, e.g. 8 seconds only (naturally this memory holding time can be adjusted to an appropriate time other than 8 seconds), A is not identical to B, and the CPU 16 will transfer the contents A of the first auxiliary memory 12 to the second auxlliary memory 13 (the step 5) and move into the standby mode.

When the contents A of the first auxiliary memory 12 or code of the magnetic card is transferred to the second auxiliary memory 13 and within a short time, e.g. the 8 seconds noted above, of the transfer, the same magnetic card is inserted into the card reader 11 again, the CPU 16 will repeat the step 3 and as A is not identical to D, the step 3 will be repeated. As the second auxiliary memory 13 now stores the contents A which was the contents of the first auxiliary memory 12 and were transferred to the second auxiliary memory 13, A is now identical to B, and the CPU 16 will transfer the contents A of the first auxiliary memory 12 to the main memory 14 (the step 6). With this procedure, the code of the magnetic card to be used as a key card will be set in the main memory 14 as an unlocking code, and the CPU 16 will actuate the display 15 (for example, a green light emitting diode) to indicate this.

In the above-mentioned step 5, if the same magnetic card is not inserted into the card reader 11 within say 8 seconds after the contents A of the first auxiliary memory 12 have been transferred to the second auxiliary memory 13, the second auxiliary memory 13 will be cancelled. It, therefore, will become necessary to repeat the procedure from reading the card or storing the code of the magnetic card in the first auxiliary memory 12 so as to transfer the code to the second auxiliary memory 13. In this way, when the code of a magnetic card to be used as a key card is set in the main memory 14, it is indicated to the user by the actuation of the display 15.

In this embodiment, the main memory 14 has, for example six addressable storage areas so that it can store up to six codes as unlocking codes. If within 20 seconds (naturally, it may be any appropriate time span other than 20 seconds) after the setting of the first code in the main memory 14 a magnetic card having a code differing from the first code is loaded into the card reader 11 and the code of said card is read repeatedly (at least twice till the display 15 is actuated), the CPU 16 ill repeat the operations of the flowchart of FIG. 2 as described above and store the code of the card in the main memory 14 as an unlocking code. In a similar manner, if within the 20 seconds period after the setting of the code of the preceding card in the main memory 14 the unlocking code setting procedure is started for another card, the code of that succeeding card can also be set as an unlocking code, and thus up to six codes of six magnetic cards each having a different code can be set as the unlocking codes. This is intended to allow up to six guests sharing the same room to use their own credit cards or the like as keys. The maximum number of cards which can be set can be freely selected by altering the number of memory areas in the main memory 14.

If a succeeding card is not inserted in the card reader 11 within 20 seconds after the setting of a code of a first or previous magnetic card in the main memory 14, or six codes are set in the main memory 14, the CPU 16 will not enable the main memory 14 to store a code even if a magnetic card is inserted into the card reader 11 unless a special card for enabling the main memory 14 is first inserted in the card reader 11.

Figure 2:
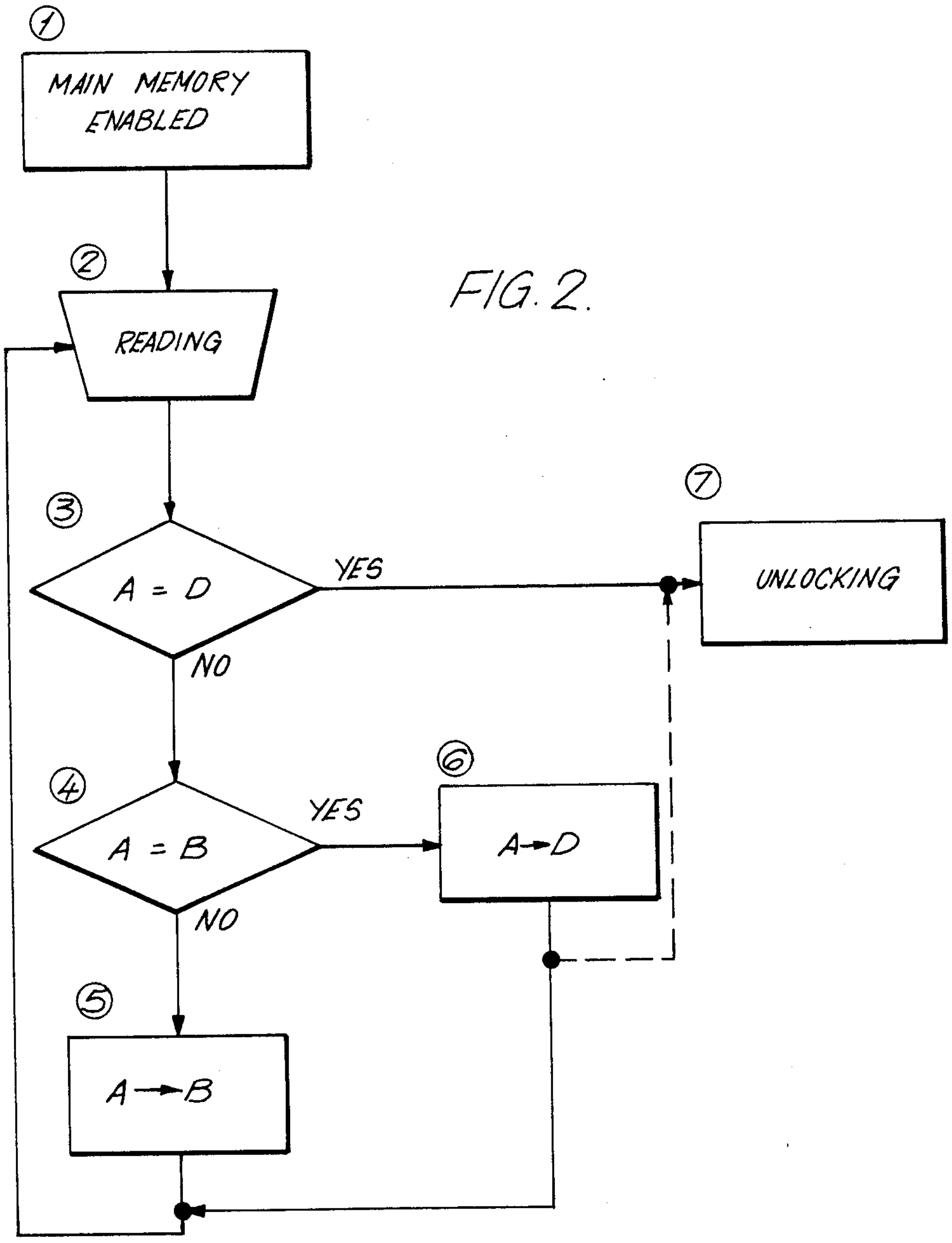
FIG. 2 is a flowchart illustrating the operation of that device.

As mentioned above, when one unlocking code or a plurality of unlocking codes are set in the main memory 14, the CPU 16 will give an unlocking command to the unlocking circuit 17 (the step 7 and unlock the lock when a magnetic card having any one of such unlocking codes is inserted in the card reader since it satisfies the condition of A=D of the step 3 of the flowchart of FIG. 2. In the above-mentioned unlocking code setting step, it may be arranged to give an unlocking command immediately after the transfer of the contents A of the first auxiliary memory 12 to the main memory 14, as shown by the broker line in FIG. 2.

Figure 3:
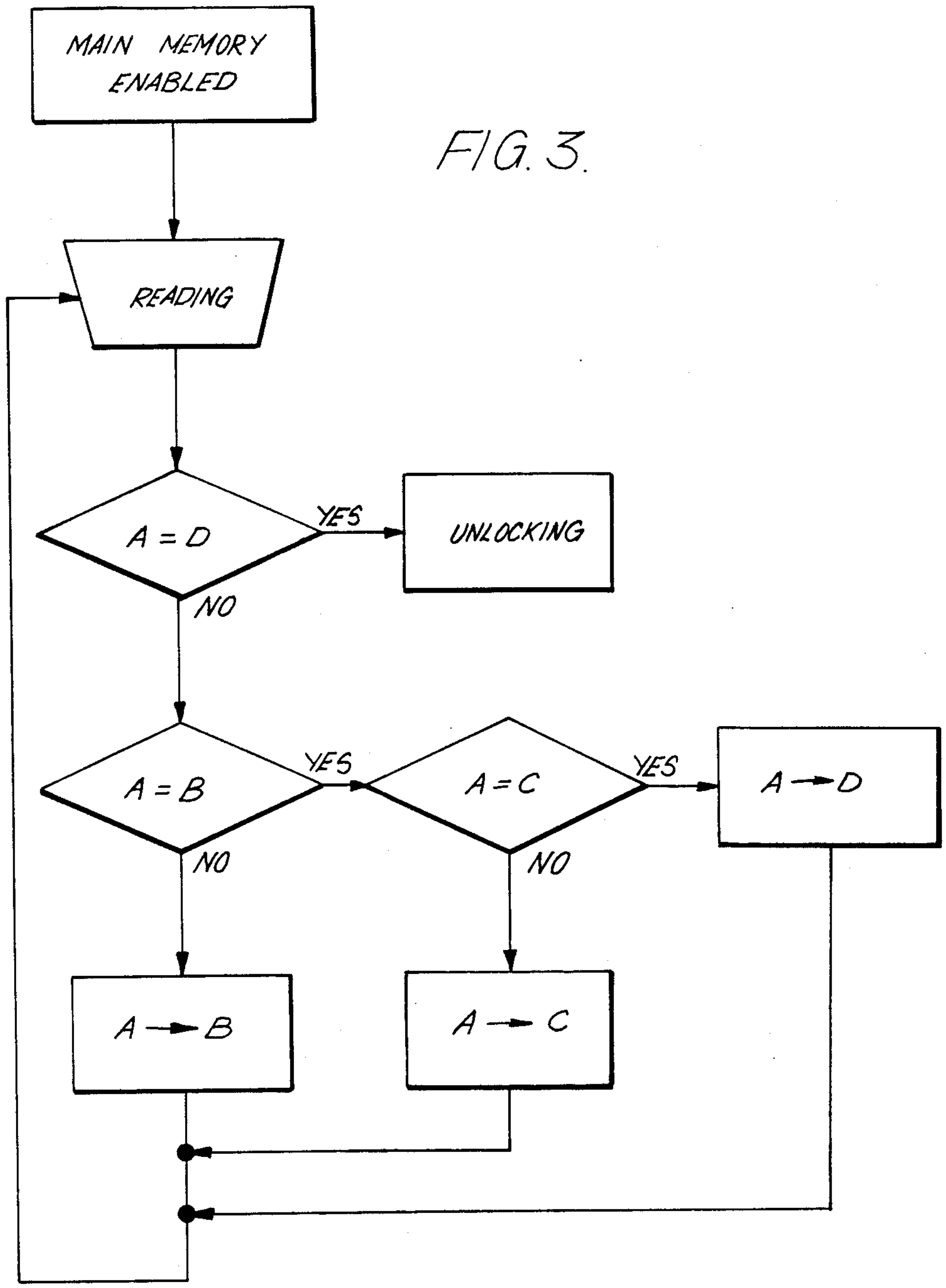
FIG. 3 is a flowchart for illustrating the operation of another embodiment of the electronic locking device according to the present invention.

The minimum number of times of loading of a magnetic card into the card reader for the unlocking code setting is not limited to twice as in the case of the above-mentioned preferred embodiment. It may be three times or more. When the number of loadings is selected to be three times, one more auxiliary memory (the contents C) may be added to the first and second auxiliary memories of the above-mentioned preferred embodiment, and the CPU 16 may be arranged to execute operation as shown by the flowchart of FIG. 3.

Further, it may be possible to arrange the locking device of the present invention so that after setting an unlocking code or unlocking codes as shown above, if the door is opened at least once within the specified time span, the code or codes will be retained as the proper unlocking codes, but if the door is not opened at all during this specified time span, the preset code or codes will be cancelled, and the initial condition or enabled state of the main memory is restored to allow setting of a new unlocking code of a different magnetic card.

As explained above, the present invention provides an electronic locking device which requires no card issuing machine, requires lower installation and running costs, is simple and reliable in operation, and also allows locking or unlocking of a safe installed in a guest room of a hotel or the like with one common magnetic card.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. An electronic locking device, which includes a main memory for storing an unlocking code, and in which an unlocking circuit is arranged to be actuated when the code of a magnetic card read by a card reader forming part of the device agrees with an unlocking code stored in the main memory, and in which an unlocking code setting means is provided which stores the code of a magnetic card in the main memory as the unlocking code when the main memory is enabled and the magnetic card is loaded into the card reader for a plurality of times within a relatively short preselected time interval, wherein the unlocking code setting means comprises

- a first auxiliary memory which stores the code of a magnetic card whenever the said card is loaded into the card reader;
- a second auxiliary memory;
- a processing unit which compares, when the main memory is enabled, the contents of the first auxiliary memory and the contents of the main memory each time a magnetic card is loaded and stores the contents of the first auxiliary memory in the main memory as the unlocking code when the contents of the first auxiliary memory agree with those of the second auxiliary memory, and writes the contents of the first auxiliary memory into the second auxiliary memory and retains them for the said preselected time when the contents of the first auxiliary memory differ from those of the second auxiliary memory, and stores the contents of the first auxiliary memory in the main memory as an unlocking code when the same magnetic card is read by the card reader and the contents of the first auxiliary memory agree with those of the second auxiliary memory.

2. An electronic locking device as claimed in claim 1 in which the unlocking code setting means allows different codes of a plurality of cards to be stored in the main memory as unlocking codes by storing the code of a second card which is loaded into the card reader within a relatively short preselected time after the code of a previous card was stored in the memory.

3. An electronic locking device as claimed in claim 1, which further includes a display means for visually indicating that the contents of the first auxiliary memory have been stored in the main memory.

4. An electronic locking device for use with a magnetic card having a code magnetically encoded thereon comprising:

a card reader for reading said code on said card;

a selectively enabled main memory for storing an unlocking code;

an unlocking code setting means responsive to said card reader for defining said unlocking code, said setting means storing an unknown magnetic card code read by said card reader in said main memory as said unlocking code when said main memory is enabled and said card is loaded into said card reader a plurality of times within a relatively short preselected time interval; and an unlocking circuit responsive to said card reader and actuable when a magnetic card code read by said card reader agrees with said unlocking code stored in said main memory.

* * * * *